US008879698B1

(12) United States Patent
Lavian et al.

(10) Patent No.: US 8,879,698 B1
(45) Date of Patent: *Nov. 4, 2014

(54) DEVICE AND METHOD FOR PROVIDING ENHANCED TELEPHONY

(76) Inventors: Tal Lavian, Sunnyvale, CA (US); Zvi Or-Bach, San Jose, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 13/411,652

(22) Filed: Mar. 5, 2012

Related U.S. Application Data

(63) Continuation-in-part of application No. 12/699,618, filed on Feb. 3, 2010.

(51) Int. Cl.
*H04M 11/00* (2006.01)
(52) U.S. Cl.
USPC ..................... 379/93.17; 379/88.18
(58) Field of Classification Search
USPC .......... 379/88.03, 88.04, 88.17, 88.18, 88.19, 379/88.23; 455/404.2
See application file for complete search history.

(56) References Cited

U.S. PATENT DOCUMENTS

| | | |
|---|---|---|
| 4,653,045 A | 3/1987 | Stanley et al. |
| 4,736,405 A | 4/1988 | Akiyama |
| 4,897,866 A | 1/1990 | Majmudar et al. |
| 5,006,987 A | 4/1991 | Harles |
| 5,007,429 A | 4/1991 | Treatch et al. |
| 5,027,400 A | 6/1991 | Baji et al. |
| 5,086,385 A | 2/1992 | Launey et al. |
| 5,144,548 A | 9/1992 | Salandro |
| 5,265,014 A | 11/1993 | Haddock et al. |
| 5,294,229 A | 3/1994 | Hartzell et al. |
| 5,335,276 A | 8/1994 | Thompson et al. |
| 5,416,831 A | 5/1995 | Chewning, III et al. |
| 5,417,575 A | 5/1995 | McTaggart |

(Continued)

FOREIGN PATENT DOCUMENTS

| | | |
|---|---|---|
| EP | 1225754 A3 | 7/2003 |
| EP | 1001597 A3 | 9/2003 |

(Continued)

OTHER PUBLICATIONS

Yin, M. and Zhai, S., "The Benefits of Augmenting Telephone Voice Menu Navigation with Visual Browsing and Search," CHI'06 Proceedings of the SIGCHI conference on Human Factors in computing systems: pp. 319-328, ACM, Montreal, Canada (Apr. 2006).

(Continued)

*Primary Examiner* — Fan Tsang
*Assistant Examiner* — Van D Huynh

(57) ABSTRACT

Embodiments of the invention provide an enhanced communication device and a method for providing enhanced telephony. The enhanced communication device comprises a processor. The enhanced communication device further comprises a memory. The memory comprises a database. The database comprises one or more destination phone numbers. Further, the database comprises at least one property associated with the one or more destination phone numbers. Further, the memory comprises instructions executable by the processor for identifying a dialed phone number of a destination. The memory also comprises instructions for determining a location code associated with a current location of the communication device. Further, the memory comprises instructions for comparing the dialed phone number to the one or more destination phone numbers. Furthermore, the method comprises instructions for displaying the at least one property associated with the one or more destination phone numbers based on the comparison.

20 Claims, 11 Drawing Sheets

(56) References Cited

U.S. PATENT DOCUMENTS

| | | |
|---|---|---|
| 5,422,809 A | 6/1995 | Griffin et al. |
| 5,465,213 A | 11/1995 | Ross |
| 5,465,401 A | 11/1995 | Thompson |
| 5,475,399 A | 12/1995 | Borsuk |
| 5,499,330 A | 3/1996 | Lucas et al. |
| 5,519,809 A | 5/1996 | Husseiny et al. |
| 5,533,102 A | 7/1996 | Robinson et al. |
| 5,550,746 A | 8/1996 | Jacobs |
| 5,572,581 A | 11/1996 | Sattar et al. |
| 5,585,858 A | 12/1996 | Harper et al. |
| 5,586,235 A | 12/1996 | Kauffman |
| 5,588,044 A | 12/1996 | Lofgren et al. |
| 5,592,538 A | 1/1997 | Kosowsky et al. |
| 5,606,361 A | 2/1997 | Davidsohn et al. |
| 5,633,909 A | 5/1997 | Fitch |
| 5,633,916 A | 5/1997 | Goldhagen et al. |
| 5,657,221 A | 8/1997 | Warman et al. |
| 5,689,648 A | 11/1997 | Diaz et al. |
| 5,724,412 A | 3/1998 | Srinivasan |
| 5,739,814 A | 4/1998 | Ohara et al. |
| 5,740,549 A | 4/1998 | Reilly et al. |
| 5,768,142 A | 6/1998 | Jacobs |
| 5,790,652 A | 8/1998 | Gulley et al. |
| 5,794,205 A | 8/1998 | Walters et al. |
| 5,796,806 A | 8/1998 | Birckbichler |
| 5,802,283 A | 9/1998 | Grady et al. |
| 5,802,526 A | 9/1998 | Fawcett et al. |
| 5,807,336 A | 9/1998 | Russo et al. |
| 5,819,225 A | 10/1998 | Eastwood et al. |
| 5,822,404 A | 10/1998 | Cave |
| 5,822,405 A | 10/1998 | Astarabadi |
| 5,838,682 A | 11/1998 | Dekelbaum et al. |
| 5,838,775 A | 11/1998 | Montalbano |
| 5,867,816 A | 2/1999 | Nussbaum |
| 5,873,068 A | 2/1999 | Beaumont et al. |
| 5,885,083 A | 3/1999 | Ferrell |
| 5,885,245 A | 3/1999 | Lynch et al. |
| 5,890,123 A | 3/1999 | Brown et al. |
| 5,892,813 A | 4/1999 | Morin et al. |
| 5,907,793 A | 5/1999 | Reams |
| 5,912,952 A | 6/1999 | Brendzel |
| 5,913,195 A | 6/1999 | Weeren et al. |
| 5,920,477 A | 7/1999 | Hoffberg et al. |
| 5,937,040 A | 8/1999 | Wrede et al. |
| 5,940,488 A | 8/1999 | DeGrazia et al. |
| 5,948,040 A | 9/1999 | DeLorme et al. |
| 5,956,034 A | 9/1999 | Sachs et al. |
| 5,982,875 A | 11/1999 | Lieben et al. |
| 5,987,103 A | 11/1999 | Martino |
| 6,009,398 A | 12/1999 | Mueller et al. |
| 6,014,428 A | 1/2000 | Wolf |
| 6,020,915 A | 2/2000 | Bruno et al. |
| 6,049,779 A | 4/2000 | Berkson |
| 6,055,513 A | 4/2000 | Katz et al. |
| 6,062,863 A | 5/2000 | Kirksey et al. |
| 6,088,429 A | 7/2000 | Garcia |
| 6,088,712 A | 7/2000 | Huang et al. |
| 6,091,805 A | 7/2000 | Watson |
| 6,091,956 A | 7/2000 | Hollenberg |
| 6,104,790 A | 8/2000 | Narayanaswami |
| 6,144,848 A | 11/2000 | Walsh et al. |
| 6,148,065 A | 11/2000 | Katz |
| 6,169,734 B1 | 1/2001 | Wilson |
| 6,212,547 B1 | 4/2001 | Ludwig et al. |
| 6,228,921 B1 | 5/2001 | Kasemann et al. |
| 6,229,694 B1 | 5/2001 | Kono |
| 6,230,197 B1 | 5/2001 | Beck et al. |
| 6,259,444 B1 | 7/2001 | Palmer et al. |
| 6,263,064 B1 | 7/2001 | O'Neal et al. |
| 6,273,726 B1 | 8/2001 | Kirksey et al. |
| 6,321,198 B1 | 11/2001 | Hank et al. |
| 6,335,678 B1 | 1/2002 | Heutschi |
| 6,366,650 B1 | 4/2002 | Rhie et al. |
| 6,373,817 B1 | 4/2002 | Kung et al. |
| 6,400,807 B1 | 6/2002 | Hewitt et al. |
| 6,405,033 B1 | 6/2002 | Kennedy, III et al. |
| 6,408,301 B1 | 6/2002 | Patton et al. |
| 6,427,063 B1 | 7/2002 | Cook et al. |
| 6,445,694 B1 | 9/2002 | Swartz |
| 6,449,595 B1 | 9/2002 | Arslan et al. |
| 6,456,706 B1 | 9/2002 | Blood et al. |
| 6,460,057 B1 | 10/2002 | Butler et al. |
| 6,463,145 B1 | 10/2002 | O'Neal et al. |
| 6,482,156 B2 | 11/2002 | Iliff |
| 6,505,146 B1 | 1/2003 | Blackmer |
| 6,510,411 B1 | 1/2003 | Norton et al. |
| 6,529,500 B1 | 3/2003 | Pandharipande |
| 6,560,320 B1 | 5/2003 | Paleiov et al. |
| 6,603,840 B2 | 8/2003 | Fellingham et al. |
| 6,606,611 B1 | 8/2003 | Khan |
| 6,606,741 B2 | 8/2003 | Kojima et al. |
| 6,636,835 B2 | 10/2003 | Ragsdale et al. |
| 6,653,930 B1 | 11/2003 | Bonomo et al. |
| 6,658,389 B1 | 12/2003 | Alpdemir |
| 6,705,869 B2 | 3/2004 | Schwartz |
| 6,714,519 B2 | 3/2004 | Luzzatti et al. |
| 6,731,625 B1 | 5/2004 | Eastep et al. |
| 6,754,181 B1 | 6/2004 | Elliott et al. |
| 6,788,770 B1 | 9/2004 | Cook et al. |
| 6,791,583 B2 | 9/2004 | Tang et al. |
| 6,816,580 B2 | 11/2004 | Timmins |
| 6,820,037 B2 | 11/2004 | Simon |
| 6,820,062 B1 | 11/2004 | Gupta et al. |
| 6,826,194 B1 | 11/2004 | Vered et al. |
| 6,829,368 B2 | 12/2004 | Meyer et al. |
| 6,856,673 B1 | 2/2005 | Banks et al. |
| 6,862,713 B1 | 3/2005 | Kraft et al. |
| 6,865,268 B1 | 3/2005 | Matthews et al. |
| 6,885,737 B1 | 4/2005 | Gao et al. |
| 6,889,195 B2 | 5/2005 | Strandberg |
| 6,920,205 B2 | 7/2005 | Hahn et al. |
| 6,920,425 B1 | 7/2005 | Will et al. |
| 6,920,431 B2 | 7/2005 | Showghi et al. |
| 6,937,705 B1 | 8/2005 | Godfrey et al. |
| 6,968,506 B2 | 11/2005 | Yacovone et al. |
| 6,990,455 B2 | 1/2006 | Vozick |
| 7,020,609 B2 | 3/2006 | Thrift et al. |
| 7,027,990 B2 | 4/2006 | Sussman |
| 7,036,128 B1 | 4/2006 | Julia et al. |
| 7,039,589 B2 | 5/2006 | Whitham |
| 7,047,196 B2 | 5/2006 | Calderone et al. |
| 7,065,188 B1 | 6/2006 | Mei et al. |
| 7,068,643 B1 | 6/2006 | Hammond |
| 7,092,738 B2 | 8/2006 | Creamer et al. |
| 7,100,118 B1 | 8/2006 | Klask |
| 7,130,391 B2 | 10/2006 | Janakiraman et al. |
| 7,136,480 B2 | 11/2006 | Mason |
| 7,139,591 B2 | 11/2006 | Callaghan et al. |
| 7,145,902 B2 | 12/2006 | Schindler et al. |
| 7,146,321 B2 | 12/2006 | Cyr et al. |
| 7,149,549 B1 | 12/2006 | Ortiz et al. |
| 7,159,008 B1 | 1/2007 | Wies et al. |
| 7,177,814 B2 | 2/2007 | Gong et al. |
| 7,180,889 B1 | 2/2007 | Kung et al. |
| 7,180,985 B2 | 2/2007 | Colson et al. |
| 7,181,401 B2 | 2/2007 | Johnson et al. |
| 7,181,502 B2 | 2/2007 | Incertis |
| 7,188,352 B2 | 3/2007 | Nathan et al. |
| 7,203,517 B2 | 4/2007 | Shimoda et al. |
| 7,206,745 B2 | 4/2007 | Surukkai et al. |
| 7,206,809 B2 | 4/2007 | Ludwig et al. |
| 7,209,124 B2 | 4/2007 | Hunt et al. |
| 7,213,061 B1 | 5/2007 | Hite et al |
| 7,215,743 B2 * | 5/2007 | Creamer et al. ........... 379/88.18 |
| 7,216,348 B1 | 5/2007 | deCarmo |
| 7,225,409 B1 | 5/2007 | Schnarel et al. |
| 7,225,455 B2 | 5/2007 | Bennington et al. |
| 7,228,492 B1 | 6/2007 | Graham |
| 7,231,636 B1 | 6/2007 | Evans |
| 7,231,656 B1 | 6/2007 | Nathan |
| 7,240,006 B1 | 7/2007 | Brocious et al. |
| 7,240,289 B2 | 7/2007 | Naughton et al. |
| 7,246,063 B2 | 7/2007 | James et al. |
| 7,248,885 B2 | 7/2007 | Benco et al. |

(56) References Cited

U.S. PATENT DOCUMENTS

| | | |
|---|---|---|
| 7,250,939 B2 | 7/2007 | Lira |
| 7,254,227 B2 | 8/2007 | Mumick et al. |
| 7,265,861 B1 | 9/2007 | Ranalli et al. |
| 7,266,185 B2 | 9/2007 | Trandel et al. |
| 7,266,186 B1 | 9/2007 | Henderson |
| 7,266,499 B2 | 9/2007 | Surace et al. |
| 7,272,222 B2 | 9/2007 | Joseph et al. |
| 7,272,497 B2 | 9/2007 | Koshiji et al. |
| 7,277,854 B2 | 10/2007 | Bennett et al. |
| 7,280,097 B2 | 10/2007 | Chen et al. |
| 7,280,646 B2 | 10/2007 | Urban et al. |
| 7,280,651 B2 | 10/2007 | Anderson |
| 7,286,990 B1 | 10/2007 | Edmonds et al. |
| 7,289,608 B2 | 10/2007 | Kumhyr |
| 7,289,904 B2 | 10/2007 | Uyeki |
| 7,299,405 B1 | 11/2007 | Lee et al. |
| 7,303,121 B2 | 12/2007 | Martinez |
| 7,319,477 B2 | 1/2008 | Katz |
| 7,324,947 B2 | 1/2008 | Jordan et al. |
| 7,328,239 B1 | 2/2008 | Berberian et al. |
| 7,330,890 B1 | 2/2008 | Partovi et al. |
| 7,353,016 B2 | 4/2008 | Roundtree et al. |
| 7,392,193 B2 | 6/2008 | Mault |
| 7,398,215 B2 | 7/2008 | Mesbah et al. |
| 7,406,413 B2 | 7/2008 | Geppert et al. |
| 7,412,533 B1 | 8/2008 | Johnson et al. |
| 7,433,452 B2 | 10/2008 | Taylor et al. |
| 7,440,898 B1 | 10/2008 | Eberle et al. |
| 7,450,112 B2 | 11/2008 | Shneidman |
| 7,466,803 B2 | 12/2008 | Burg et al. |
| 7,492,883 B2 | 2/2009 | Kumhyr |
| 7,539,484 B2 | 5/2009 | Roundtree |
| 7,546,143 B2 | 6/2009 | Nelson et al. |
| 7,584,249 B2 | 9/2009 | Mummick et al. |
| 7,606,741 B2 | 10/2009 | King et al. |
| 7,646,858 B2 | 1/2010 | Salafia et al. |
| 7,693,720 B2 | 4/2010 | Kennewick et al. |
| 7,720,091 B2 | 5/2010 | Faber et al. |
| 7,729,490 B2 | 6/2010 | Hemm et al. |
| 7,757,173 B2 | 7/2010 | Beaman |
| 7,809,376 B2 | 10/2010 | Letourneau et al. |
| 7,813,485 B2 | 10/2010 | Yin et al. |
| 7,843,899 B2 | 11/2010 | Burritt |
| 7,864,944 B2 | 1/2011 | Khouri et al. |
| 7,908,381 B2 | 3/2011 | Koch et al. |
| 7,966,188 B2 | 6/2011 | Ativanichayaphong et al. |
| 8,000,454 B1 * | 8/2011 | Or-Bach et al. ............ 379/88.18 |
| 8,023,624 B2 | 9/2011 | Kargman et al. |
| 8,054,952 B1 | 11/2011 | Or-Bach et al. |
| 8,155,280 B1 * | 4/2012 | Or-Bach et al. ............ 379/88.13 |
| 8,160,215 B2 * | 4/2012 | Or-Bach et al. ............ 379/88.18 |
| 8,223,931 B1 * | 7/2012 | Lavian et al. ............. 379/88.13 |
| 8,345,835 B1 * | 1/2013 | Or-Bach et al. ............ 379/88.23 |
| 8,406,388 B2 * | 3/2013 | Or-Bach et al. ............ 379/88.13 |
| 2002/0055844 A1 | 5/2002 | L'Esperance et al. |
| 2002/0147986 A1 | 10/2002 | Michael et al. |
| 2003/0005126 A1 | 1/2003 | Schwartz et al. |
| 2003/0007625 A1 | 1/2003 | Pines et al. |
| 2003/0033382 A1 | 2/2003 | Bogolea et al. |
| 2003/0074198 A1 | 4/2003 | Sussman |
| 2003/0112931 A1 | 6/2003 | Brown et al. |
| 2004/0034561 A1 | 2/2004 | Smith |
| 2004/0122941 A1 | 6/2004 | Creamer et al. |
| 2004/0198316 A1 | 10/2004 | Johnson |
| 2004/0204116 A1 | 10/2004 | Ben Efraim et al. |
| 2005/0004977 A1 | 1/2005 | Roberts et al. |
| 2005/0055310 A1 | 3/2005 | Drewett et al. |
| 2006/0203977 A1 | 9/2006 | Erhart et al. |
| 2006/0239422 A1 | 10/2006 | Rinaldo et al. |
| 2006/0259424 A1 | 11/2006 | Turcotte et al. |
| 2006/0262921 A1 | 11/2006 | Eppel et al. |
| 2006/0285662 A1 | 12/2006 | Yin et al. |
| 2007/0026852 A1 | 2/2007 | Logan et al. |
| 2007/0032247 A1 | 2/2007 | Shaffer et al. |
| 2007/0038513 A1 | 2/2007 | Flax et al. |
| 2007/0094109 A1 | 4/2007 | Perry |
| 2007/0123223 A1 | 5/2007 | Letourneau et al. |
| 2007/0239537 A1 | 10/2007 | Protheroe et al. |
| 2007/0243887 A1 | 10/2007 | Bandhole et al. |
| 2007/0298776 A1 | 12/2007 | Arlene |
| 2008/0039056 A1 * | 2/2008 | Mathews et al. ............ 455/414.1 |
| 2008/0066015 A1 | 3/2008 | Blankenhorn |
| 2008/0095330 A1 | 4/2008 | Jin et al. |
| 2008/0226042 A1 * | 9/2008 | Singh ........................ 379/88.04 |
| 2008/0250334 A1 | 10/2008 | Price |
| 2008/0268823 A1 * | 10/2008 | Shalev et al. ................. 455/415 |
| 2009/0041215 A1 | 2/2009 | Schmitt et al. |
| 2009/0116414 A1 | 5/2009 | Or et al. |
| 2009/0136014 A1 | 5/2009 | Bigue et al. |
| 2009/0154666 A1 * | 6/2009 | Rios et al. .................. 379/88.18 |
| 2009/0202503 A1 | 8/2009 | Berger et al. |
| 2009/0207980 A1 | 8/2009 | Berger et al. |
| 2009/0207996 A1 | 8/2009 | Berger et al. |
| 2009/0225788 A1 | 9/2009 | Kephart et al. |
| 2009/0228908 A1 | 9/2009 | Margis et al. |
| 2009/0276441 A1 | 11/2009 | Malik |
| 2009/0276708 A1 | 11/2009 | Smith et al. |
| 2009/0280863 A1 | 11/2009 | Shin et al. |
| 2009/0285380 A1 | 11/2009 | Chen et al. |
| 2010/0007028 A1 | 1/2010 | Fachmann et al. |
| 2010/0021030 A1 | 1/2010 | Collins et al. |
| 2010/0049654 A1 | 2/2010 | Pilo et al. |
| 2010/0087175 A1 | 4/2010 | Roundtree |
| 2010/0100377 A1 | 4/2010 | Madhavapeddi et al. |
| 2010/0166158 A1 | 7/2010 | Costello et al. |
| 2010/0172481 A1 | 7/2010 | Canu et al. |
| 2010/0189250 A1 | 7/2010 | Williams et al. |
| 2011/0009096 A1 | 1/2011 | Rotsztein et al. |
| 2011/0014952 A1 | 1/2011 | Minton |
| 2011/0060683 A1 | 3/2011 | Salmon Rock et al. |
| 2011/0091021 A1 | 4/2011 | Adkar et al. |
| 2011/0099116 A1 | 4/2011 | Gabel |
| 2011/0123004 A1 * | 5/2011 | Chang et al. .............. 379/88.01 |
| 2011/0276408 A1 | 11/2011 | Toole |
| 2012/0063574 A1 | 3/2012 | Or-Bach et al. |
| 2012/0257002 A1 * | 10/2012 | Stocker .................... 348/14.08 |
| 2013/0022191 A1 * | 1/2013 | Or-Bach et al. .......... 379/218.01 |
| 2013/0078970 A1 * | 3/2013 | Rotsztein et al. .......... 455/414.1 |
| 2013/0108030 A1 * | 5/2013 | Snir et al. .................. 379/88.01 |
| 2013/0138443 A1 * | 5/2013 | Kim et al. ................... 704/270.1 |
| 2013/0142320 A1 * | 6/2013 | Williams et al. .......... 379/93.25 |
| 2013/0343534 A1 * | 12/2013 | Nguyen et al. ........... 379/265.09 |
| 2014/0003594 A1 * | 1/2014 | Chatterjee ................. 379/142.17 |

FOREIGN PATENT DOCUMENTS

| | | |
|---|---|---|
| EP | 1351477 A1 | 10/2003 |
| EP | 1120954 A3 | 6/2005 |
| EP | 1545101 A3 | 12/2005 |
| EP | 774853 B1 | 5/2006 |
| EP | 1874018 A1 | 1/2008 |
| JP | 2004274425 A | 9/2004 |
| WO | 9819259 A1 | 5/1998 |
| WO | 9840826 A3 | 12/1998 |
| WO | 9856158 A3 | 3/1999 |
| WO | 9848551 A3 | 4/1999 |
| WO | 0131497 A1 | 5/2001 |
| WO | 0157851 A1 | 8/2001 |
| WO | 0165871 A1 | 9/2001 |
| WO | 9820409 A8 | 11/2001 |
| WO | 0217604 A1 | 2/2002 |
| WO | 2004049306 A1 | 6/2004 |
| WO | 2004064299 A3 | 7/2005 |
| WO | 2007012831 A1 | 2/2007 |
| WO | 2007081929 A3 | 1/2008 |
| WO | 2008086320 A1 | 7/2008 |
| WO | 2009006173 A3 | 3/2009 |
| WO | 2009100477 A1 | 8/2009 |

OTHER PUBLICATIONS

Damhuis, M., et al., "A Multimodal Consumer Information Server with IVR Menu," 2nd IEEE Workshop on Interactive Voice Technol-

(56) References Cited

OTHER PUBLICATIONS ogy for Telecommunications Applications (IVTTA94): pp. 73-76, Kyoto, Japan (Sep. 1994).
Shah, S.AA., et al., "Interactive Voice Response with Pattern Recognition Based on Artificial Neural Network Approach," International Conference on Emerging Technologies: pp. 249-252, (Nov. 2007).
Trihandoyo, A., et al., "A real-time speech recognition architecture for a multi-channel interactive voice response system," International Conference on Acoustics, Speech, and Signal Processing vol. 4: pp. 2687-2690, (1995).
Hattori, S., et al., "A multimedia intelligent message communication system for distributed coordination environments," Electronics & Communications in Japan, Part I—Communications, vol. 76, No. 1, pp. 11-23 (1993).
Patent abstracts of Japan, vol. 097, No. 001, Jan. 31, 1997 & JP 08 242307 A (Canon Inc), Sep. 17, 1996.
Kalva, H., et al., "Delivering Object-Based Audio-Visual Services," IEEE Transactions on Consumer Electronics, vol. 45, No. 4, pp. 1108-1111, (1999).
Schmandt, "Phoneshell: the telephone as computer terminal," Proceedings of first ACM International Conference on Multimedia, Anaheim, CA, US, pp. 373-381, (1993).
Himberg, J., et al., "Time Series Segmentation for Context Recognition in Mobile Devices", IEEE, 203-210, (2001).
Chris Schmandt and Stephen Casner, "Phonetool: Integrating Telephones and Workstations," IEEE Communication Society, Nov. 27-30, pp. 0970-0974, (1989).
Basinger, R. G., et al., "Calling Card Service—Overall Description and Operational Characteristics", The Bell System Technical Journal, (1982).
Cadiz et al. "Designing and Deploying an Information Awareness interface" CSCW'02, Nov. 2002, ACM, pp. 314-323.
Corcoran et al. disclose "User interface technologies for home appliances and networks", IEEE Trans. Consumer Elect.; pp. 679-685, (1998).
Nancy Friedrich, "Graphical-User-Interface Module Eases Integration," Wireless Systems Design, Oct. 2004, 1 page.
Balachandran, R., et al., "Dialog System for Mixed Initiative One-Turn Address entry and Error Recovery," Proceedings of SIGDIAL 2009, the 10th Annual Meeting of the Special Interest Group in Discourse and Dialogue, pp. 152-155, Queen Mary University of London, Association of Computational Logistics, (2009).

\* cited by examiner

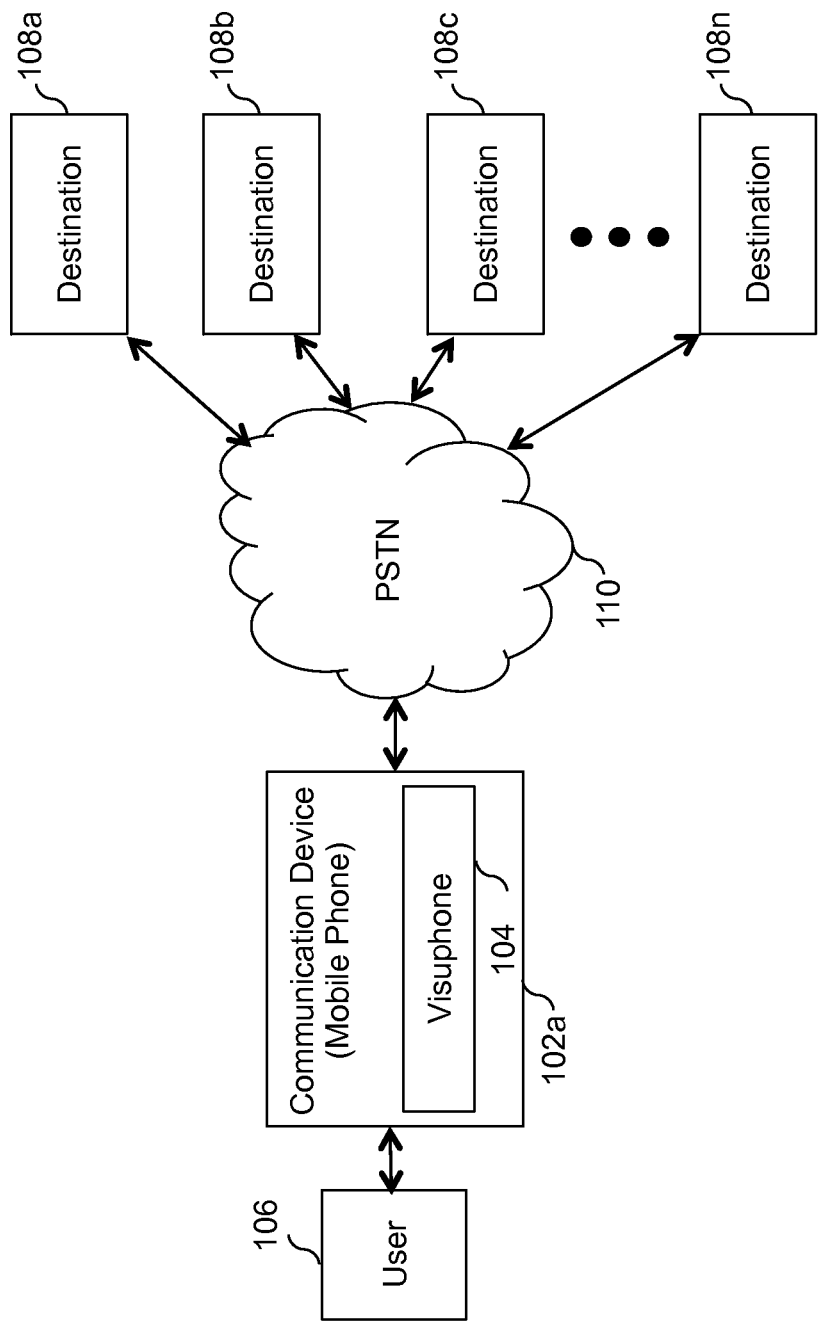

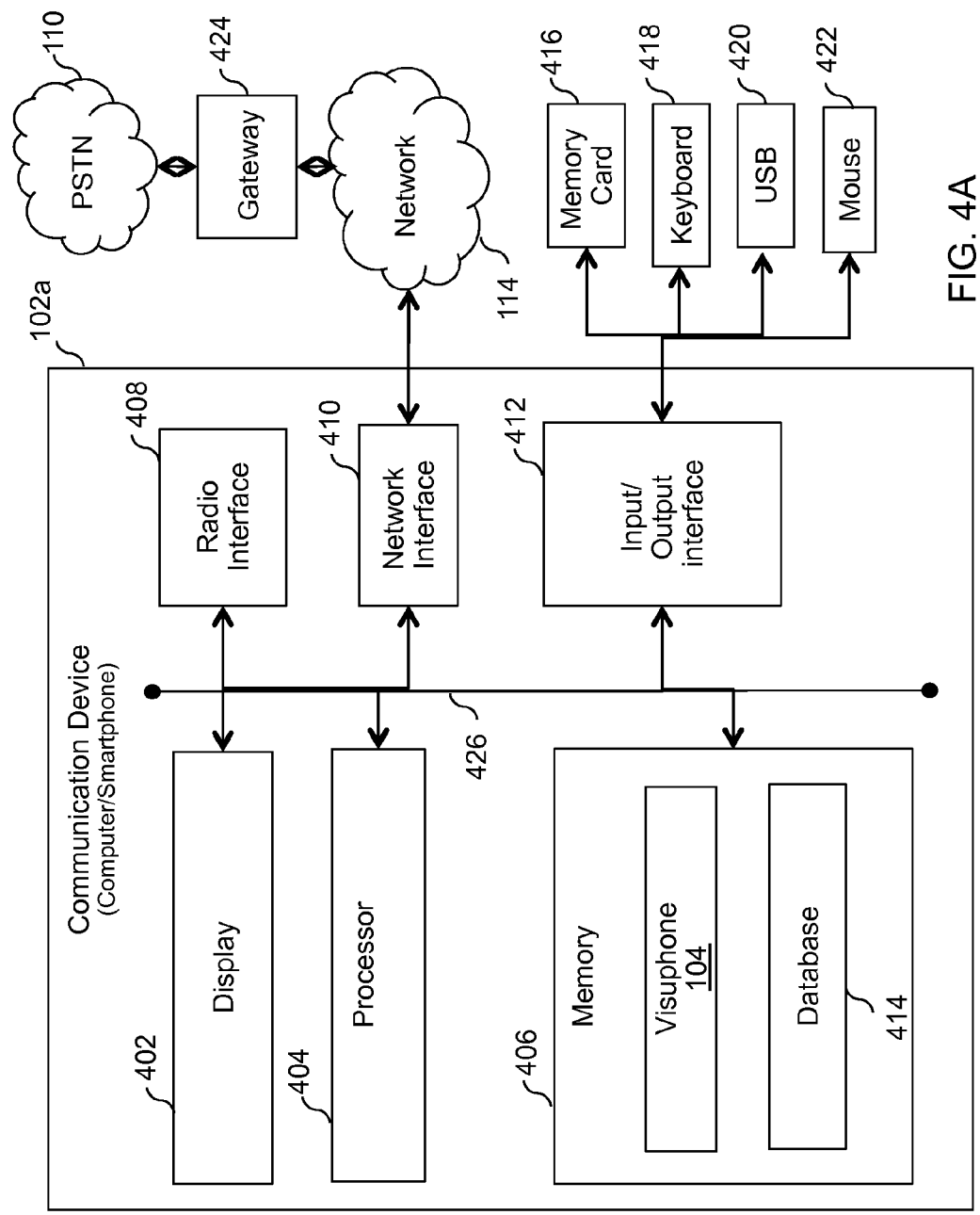

DEVICE AND METHOD FOR PROVIDING ENHANCED TELEPHONY

CROSS REFERENCE TO RELATED APPLICATIONS

This application is a Continuation-In-Part (CIP) of U.S. Non-Provisional application Ser. No. 12/699,618 entitled 'Systems and methods for visual presentation and selection of IVR menu' and filed on Feb. 3, 2010.

FIELD OF THE INVENTION

The invention relates to telecommunications and more specifically relates to providing enhanced telephony on a communication device.

BACKGROUND OF THE INVENTION

Generally, Interactive Voice Response (IVR) systems are allows a user to interact with an audio response system. The IVR systems can provide prompts to a user and receive touch tone and/or spoken responses on the prompts from the user. Through such IVR dialogue the system collects sufficient information about the user to direct the call to the most appropriate resource, information processing system or the like. Various organizations such as banks, insurance companies, and other service providers use IVR system to manage calls from their customers. Typically, IVR systems are used by organizations that have high call volumes. An objective for implementing the IVR systems is to provide the users or customers with a quick and good experience. Moreover, or the cost of providing the services is reduced.

Typically, in case of an audio IVR menu the user calling the destination may have to listen and follow instructions on the menu to get a desired response or a function performed. Therefore, the process can be time consuming. Moreover, in case the user provides an incorrect input, the complete process may have to be repeated. Furthermore, the IVR menu for an organization may be updated or changed regularly. For example, extension numbers inside an organization may be changed and correspondingly, the extension numbers associated with the IVR menu may be updated. As a result, a frequent user may not be able to reach a desired end by remembering a combination of numbers. Therefore, the user may become frustrated with the IVR systems.

Usually, the IVR menus are same for all the users. Therefore, the customer has to listen them carefully to select the appropriate option. Some existing techniques try to address this problem by providing visual form of IVR. U.S. Pat. No. 7,215,743 assigned to International Business Machines Corporation and a published U.S. patent application with Ser. No. 11/957,605, filed Dec. 17, 2007 and assigned to Motorola Inc., provides the IVR menu of the destination in a visual form to the user. Therefore, the user can select the options from the IVR menu without listening to the complete audio IVR menu.

Various service providers that implement IVR systems may have multiple stores or outlets in and around a particular geographical area. Further, each outlet may have a different phone number but have the same IVR menu. Therefore, the user may not be aware of all the phone numbers. Moreover, some outlets may be located relatively farther that other outlets from the geographical location of the caller. Further, some outlets may not provide the services desired by the user. Generally, more than one provider may provide similar products or services. For example, various banks may provide similar banking services, or various pizzerias may provide similar type of pizzas. Therefore, the user may prefer to call or use an outlet that is near for better services and time management.

In the light of the above discussion, techniques are desired for providing enhanced telephony.

SUMMARY

Embodiments of the invention provide an enhanced communication device. The enhanced communication device comprises a processor and a memory coupled to the processor. The memory comprises a database including one or more destination phone numbers and at least one property associated with the destination phone numbers. Further, the memory comprises instructions executable by the processor for identifying a dialed phone number of a destination, determining a location code associated with a current location of the communication device, comparing the dialed phone number to one or more destination phone numbers stored in a database, and displaying at least one property associated with the one or more destination phone numbers based on the comparison.

Embodiments of the invention provide an enhanced communication device. The enhanced communication device comprises a database including one or more destination phone numbers and at least one property associated with the destination phone numbers. Further, the enhanced communication device comprises means for identifying a dialed phone number of a destination, means for determining a location code associated with a current location of the communication device, means for comparing the dialed phone number to one or more destination phone numbers stored in a database, and means for displaying at least one property associated with the one or more destination phone numbers based on the comparison.

Embodiments of the invention provide a method for providing enhanced telephony. The method includes identifying a phone number of a destination dialed from a communication device; determining a location code associated with a current location of the communication device; and comparing the dialed phone number to one or more destination phone numbers stored in a database. The database may include at least one property associated with the destination phone numbers. Further, the method includes displaying, at the communication device, the at least one property associated with the one or more destination phone numbers based on the comparison.

An aspect of the invention is to provide a visual IVR menu of a destination according to the location of the communication device of a user and/or a location of the dialed destination phone number.

Another aspect of the invention is to provide the position based visual IVR menus in a communication network.

BRIEF DESCRIPTION OF THE DRAWINGS

Figure 1B:
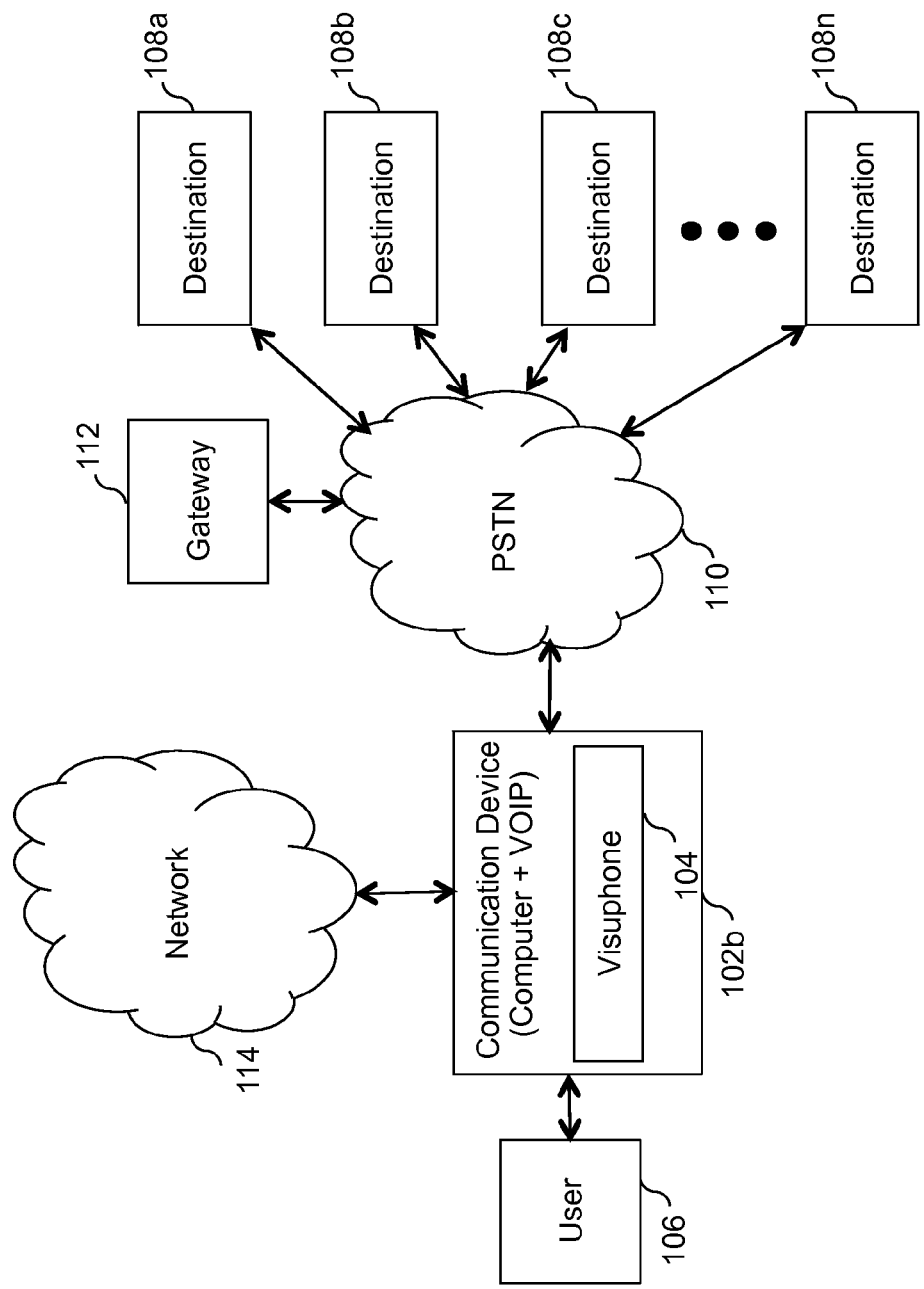
Figure 1C:
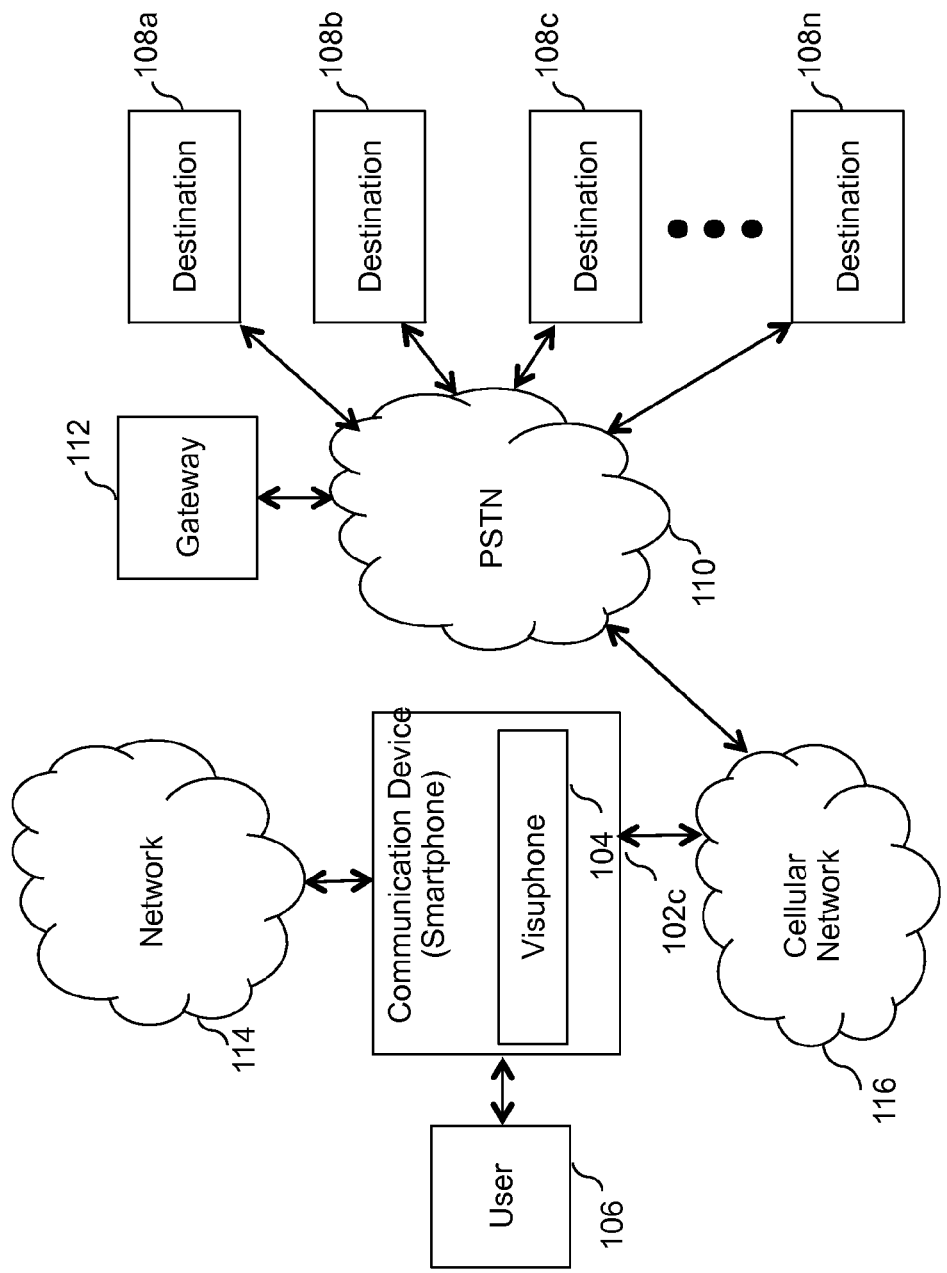
Figure 2:
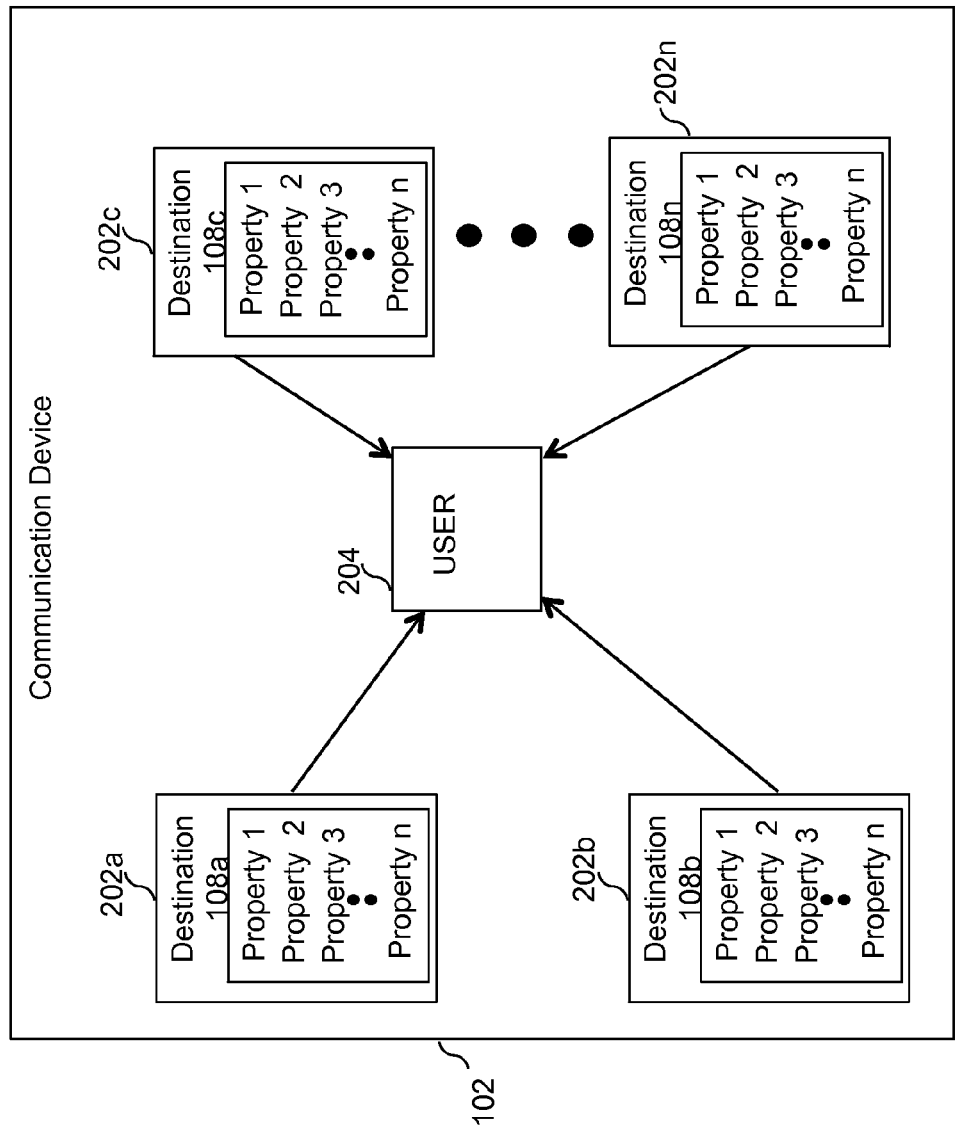
Figure 3:
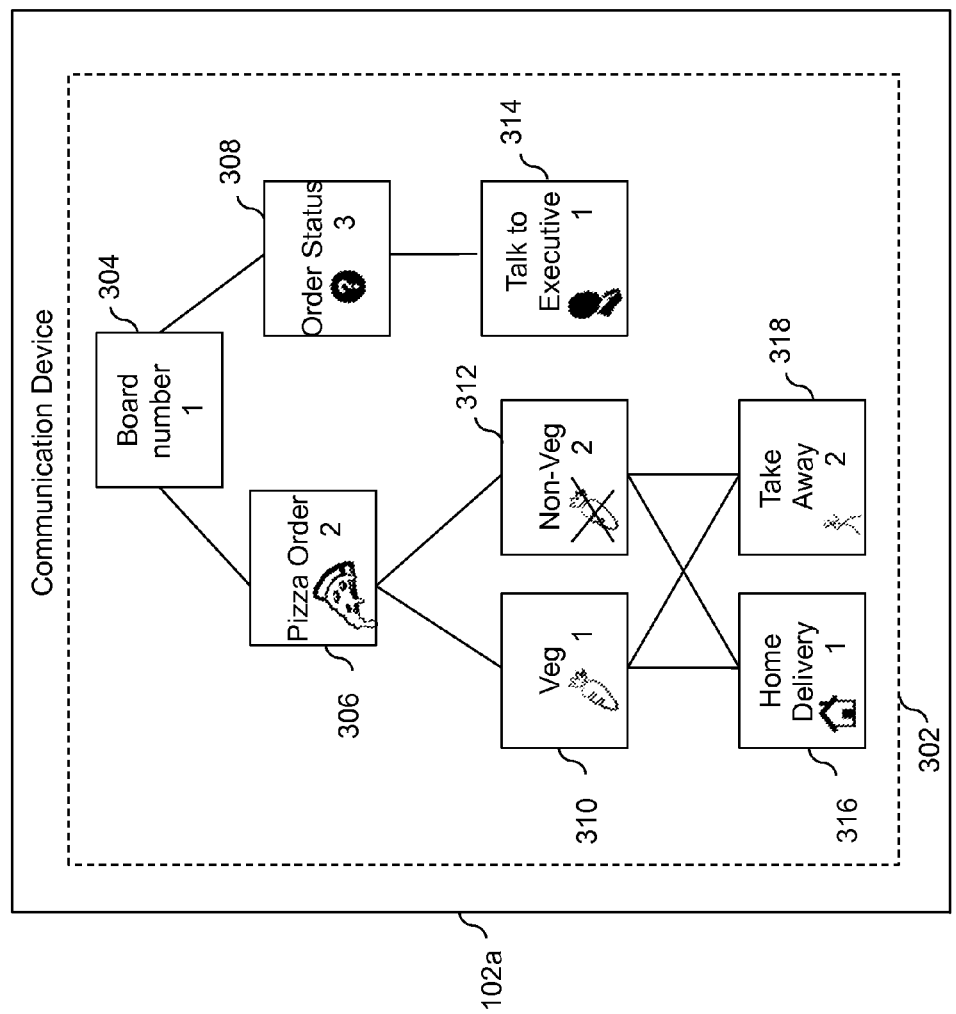
Figure 4B:
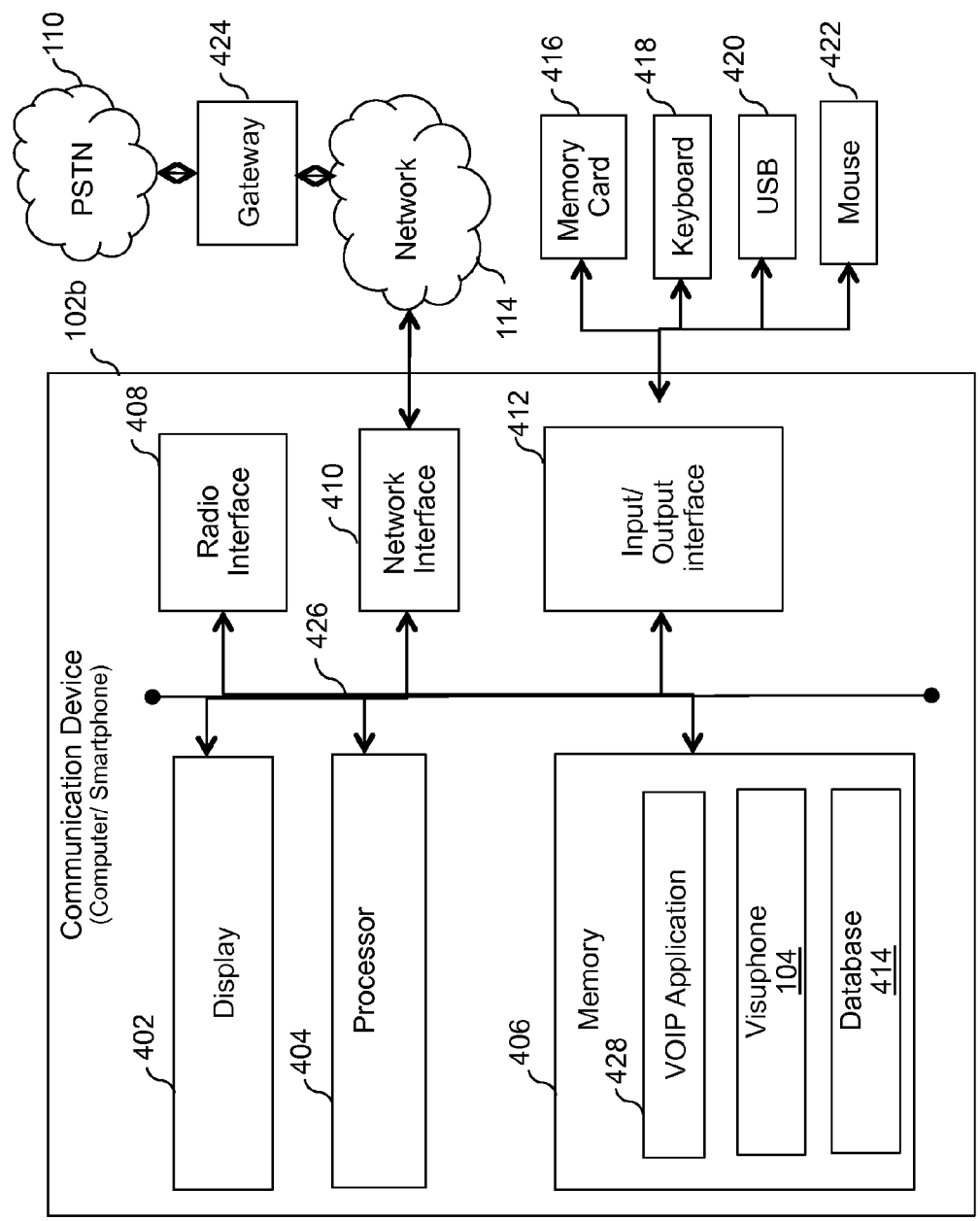
Figure 5:
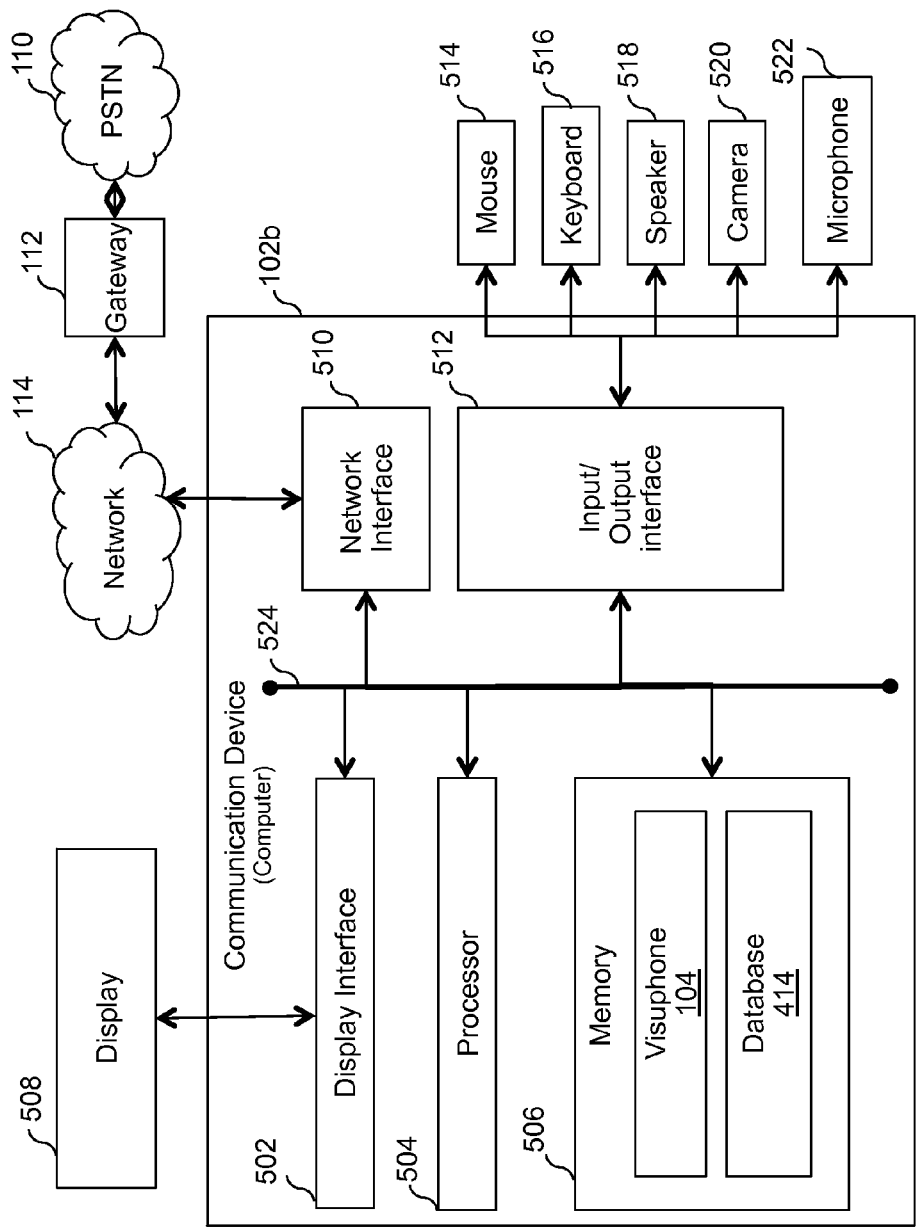
Figure 6A:
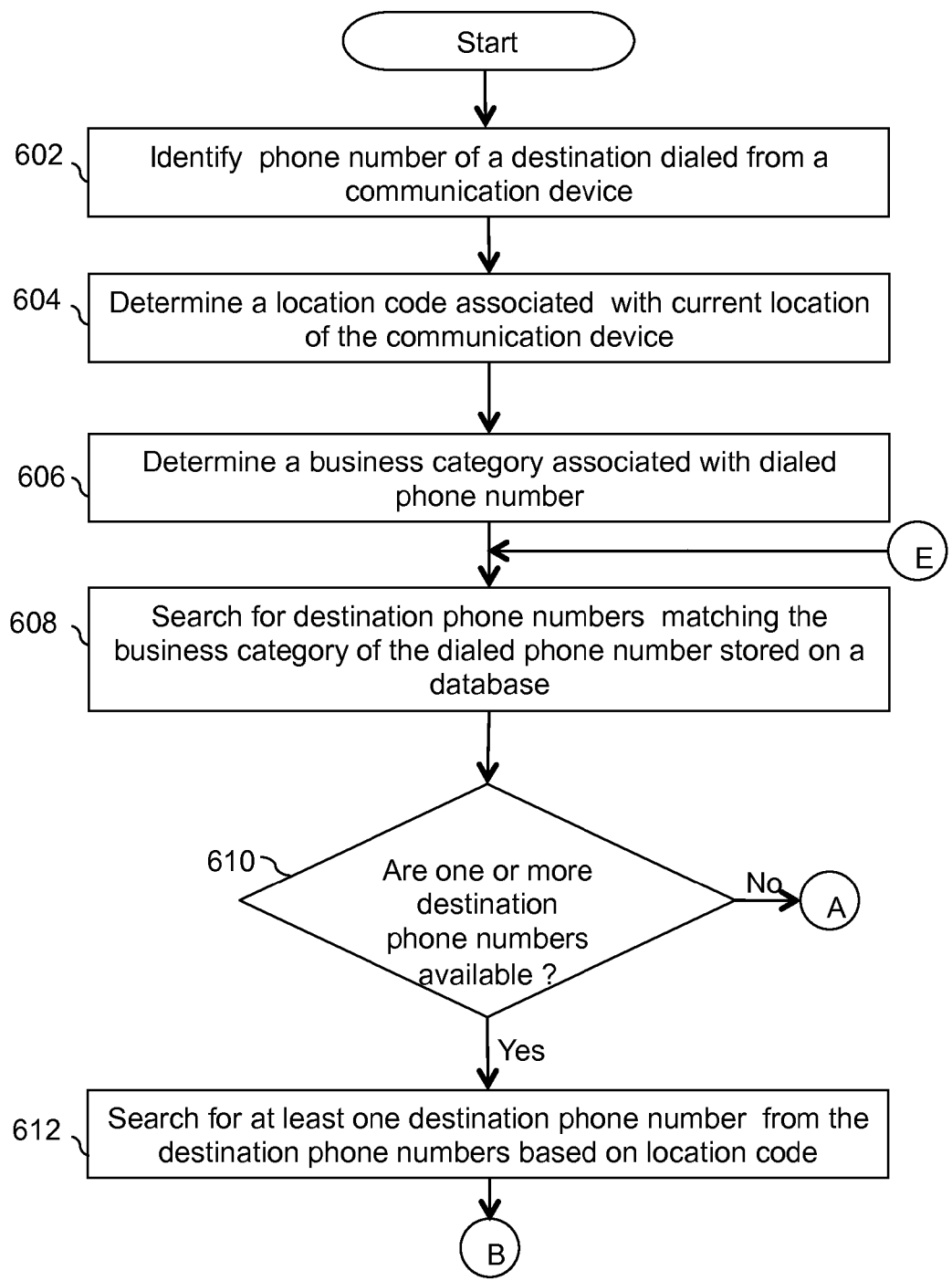
Figure 6B:
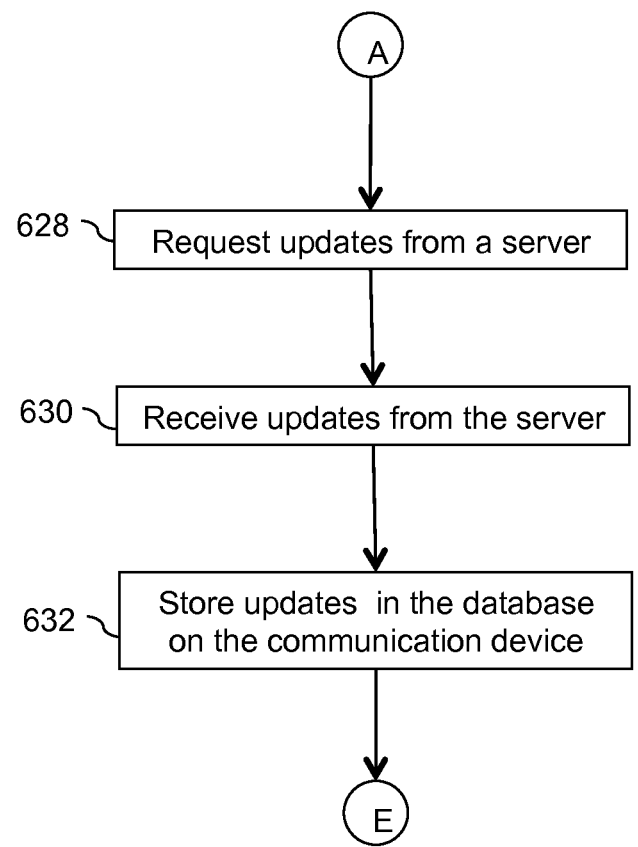
Figure 6C:
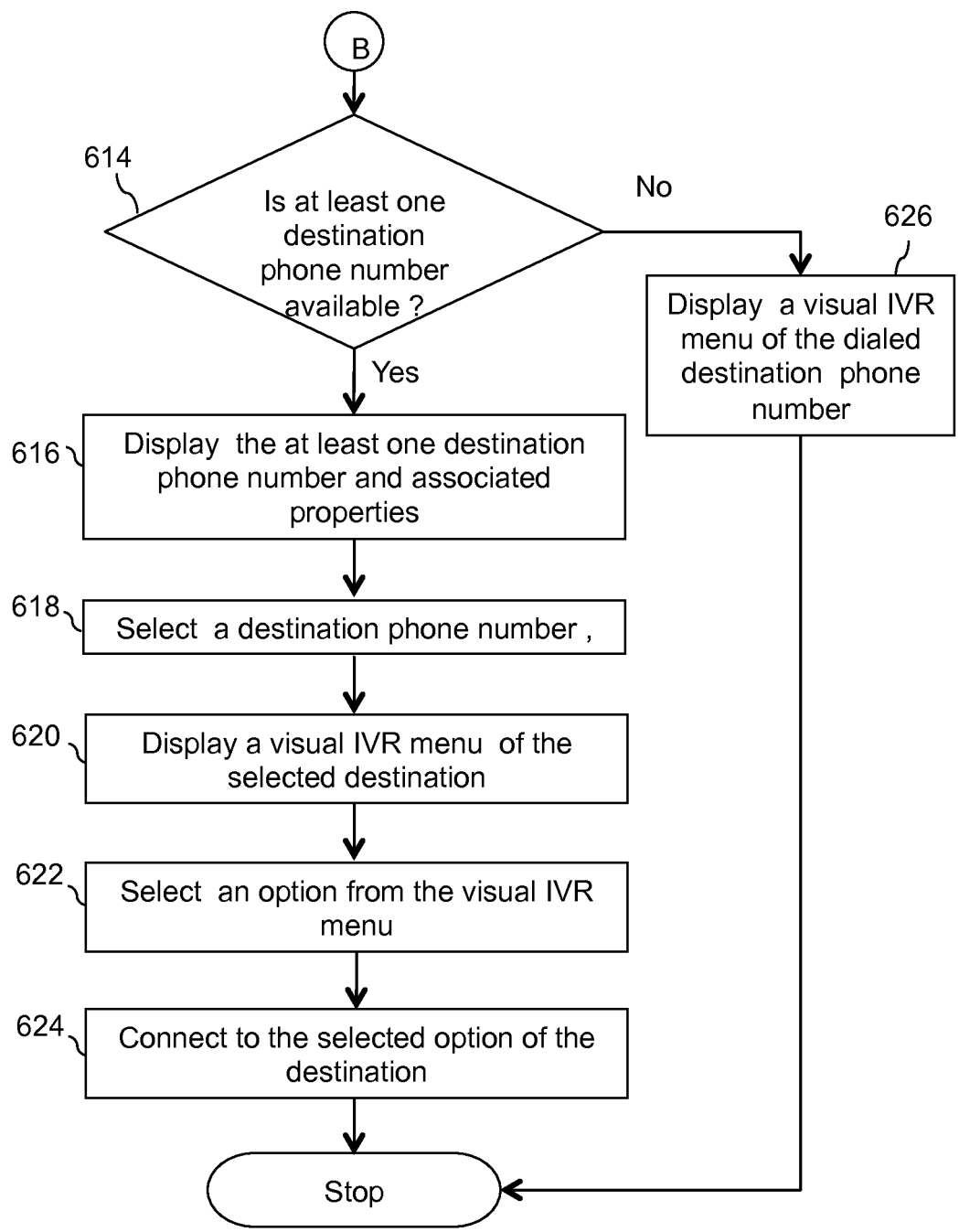

Having thus described the invention in general terms, reference will now be made to the accompanying drawings, which are not necessarily drawn to scale, and wherein:

FIG. 1A illustrates an exemplary environment where various embodiments of the invention function;

FIG. 1B illustrates another exemplary environment where various embodiments of the invention function;

FIG. 1C illustrates yet another exemplary environment where various embodiments of the invention function;

FIG. 2 illustrates an exemplary representation of one or more destinations and their associated properties on the communication device;

FIG. 3 illustrates an exemplary visual IVR menu at a communication device corresponding to an audible IVR menu of the destination;

FIGS. 4A and 4B illustrates exemplary components of the communication device for implementing an Application, in accordance with an embodiment of the invention;

FIG. 5 illustrates exemplary components of the communication device for implementing the Application, in accordance with another embodiment of the invention; and FIGS. 6A, 6B, and 6C illustrate a flowchart for providing enhanced telephony, in accordance with an embodiment of the invention;

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates an exemplary environment where various embodiments of the invention function. A user 106 may use a communication device 102a to connect to destinations 108a-n. The communication device 102a can be a telecommunication device that can connect directly to a Public Switched Telephone Network (PSTN) 110. A person skilled in the art will appreciate, that the communication device 102a can also connect to a private telephone exchange. Examples of the communication device 102a include, but are not limited to, a telephone, a mobile phone, a smartphone or any other device capable of voice or data communication. The user 106 connects to a destination from destinations 108a-n by dialing a phone number of a destination. The destinations 108a-n may include one or more audible Interactive Voice Response (IVR) menus. Further, the destinations 108a-n can have different audio IVR menus. For example, IVR menus of a hospital may be completely different from that of a bank. Typically, the audible IVR menu provided by destinations 108a-n comprises audible options or instructions. The user 106 may be required to select various options from the audio IVR menu to obtain the required resource/information or service from the dialed destination. Various types of destinations 108a-n that implement the audible IVR menu include, for example, banks, hotels, fast-food outlets, utility services providers, corporate offices, mobile phone service providers, hospitals and so forth.

The communication device 102a includes a Visuphone 104 that provides information regarding a phone number dialed from communication device 102a. For example, the information may include geographical information of the destinations and/or the user. Further, the Visuphone 104 may display a visual IVR menu on the communication device 102a corresponding to the audible IVR menu based of a phone number of the destination to be connected. The Visuphone 104 may be hardware, software, or a firmware implemented on the communication device 102a, or a combination thereof. The visual IVR menu may have one or more options. Thereafter, the user 106 can select the options of the audible IVR menu from the visual IVR menu display without the requirement to listen to the audible instructions. Exemplary audible IVR menu at the destination 108a and a corresponding visual IVR menu are explained in detail in FIG. 3.

In an embodiment of the invention, the communication device 102a can request for updates from a server through a communication network. The server may maintain the updated information of destinations and their associated properties. The communication network can include more than one communication devices. Examples of the communication network include, but are not limited to, the Network, PSTN, Local Area Network (LAN), Wide Area Network (WAN), and so forth.

FIG. 1B illustrates another exemplary environment where various embodiments of the invention function. As shown, a communication device 102b can be a communication device that can be connected directly to network 114. Examples of the communication device 102b include, but are not limited to, a personal computer, a laptop, a mobile phone, a smartphone, a fixed line telephone, a Voice Over Network Protocol (VOIP) phone or other devices capable of voice or data communication. The communication device 102b may include various applications or computer programs that enable the user 106 to use the communication device 102b for connecting to destinations 108a-n through PSTN 110 over network 114 through a gateway 112. For example, the applications may be VOIP applications, such as but not limited to, Skype, Magic Jack, Google Talk and so forth. Examples of the network 114 include any wired or wireless network, such as but not limited to, LAN, WAN, a Wi-Fi network and so forth. As discussed with reference to FIG. 1A, destinations 108a-n presents the audible IVR to the user 106. The communication device 102b includes the Visuphone 104 that displays a visual IVR menu corresponding to the audible IVR menu based on a dialed destination phone number.

FIG. 1C illustrates yet another exemplary environment where various embodiments of the invention function. As shown, the communication device 102b can be connected to the PSTN 110 through the network 114 or through the cellular network 116. Various service providers provide multiple or overlapping services to customers. For example, cable television service provider may also provide phone and Network service, optical Network provider may also provide phone or television services, WiMax service providers that provide phone service and so forth. The network 114 may be any service provider that provides such services, for example, but not limited to, cell phone services, wireless services, Network services, cable television services, or various combinations of the above or other type of services. As discussed with reference to FIG. 1A, the destinations 108a-n includes one or more audible IVR menus. The communication device 102b includes the Visuphone 104 which displays geographical information corresponding to destination phone number dialed. Further, Visuphone 104 may display visual IVR menu corresponding to audible IVR menu of the destination phone number. The geographical information may be displayed before a connection is established between the communication device 102b and the destination. Moreover, the visual IVR menu is displayed after the user 106 selects one or more destinations based on the information displayed. In an embodiment of the invention, the Visuphone 104 displays information for destinations 108a-n based on a business category. For example, if the phone number dialed by the user 106 corresponds to a bank, then the information displayed may relate to the specific bank dialed and/or other banks. In another embodiment of the invention, the Visuphone 104 displays the information based on a relative geographical distance of the user 106 from that of dialed destination. The distance may be within a predefined range. For example, the pre-defined range can be 5 km, 500 m, a user defined value and so forth.

FIG. 2 illustrates an exemplary display of representations 202a-n of the destinations 108a-n on the communication device 102. The representations 202a-n may include properties associated with the destination 108a-n. Examples of the properties include but are not limited to an address, a location code, a branch code, rating, reviews, phone numbers, distance from the user 106 and so forth. In an embodiment of the invention, a user representation 204 corresponding to the user 106 is displayed on the communication device 102. Examples of the representation include, but are not limited to, graphical or text representations such as a table of rows and columns, icons, area maps and so forth. The representations 202a-n may also include the distance of the destinations 108a-n with respect to the location of the user 106. Thereafter, the user 106 may select a destination from the representation to connect. Subsequently, the visual IVR menu of the selected destination may be displayed on the communication device 102. In an embodiment, the display may include representation of a subset of destinations 108a-n based on one or more criteria. The one or more criteria include displaying destination based on business category of dialed destination phone number. In an embodiment, the one or more criteria may also include displaying destinations based on location of the communication device 102.

In an embodiment of the invention, the communication device 102 may be an in-car navigation system such as a Global Positioning System (GPS). Therefore, when the user 106 dials a phone number of a destination, the Visuphone 104 may provide a representation of one or more destinations on a map on the communication device 102a screen. Further, the properties like location, reviews, ratings etc. associated with the destination may be displayed on the map. The user interacts with the displayed maps and can select a destination from the map based on the one or more properties. Further, the user 106 can select a destination by clicking or scrolling on the map. In an embodiment of the invention, a route map from the user 106 to the selected destination may be displayed on the communication device 102a screen.

FIG. 3 illustrates an exemplary visual IVR menu 302 of the selected destination with added graphics for the nodes on the communication device 102. The visual IVR menu includes one or more options corresponding to every node in the destination. It is well known that graphics are easier to learn and are faster to recognize than words. Therefore, graphics are used in various computerized device interfaces. Various types of graphics can be displayed for example, animated icons, icons that highlight or animate when the node is highlighted, and so forth. The graphics may be displayed for each node or a few nodes based on the usability of the visual IVR menu 302. For example, for the node 310 an icon of a vegetable may be displayed to designate a vegetarian pizza, and for the node 316 of home delivery, an icon of house may be displayed. In an embodiment of the invention, the visual IVR menu 302 can be customized to display only the text, only the icons or both. Furthermore, the user 106 can suggest or use various icons based on his preferences. The visual IVR menu is specific to a destination. Further each of the destinations 108a-n may have more than one audio IVR menus. So different visual IVR menu corresponding to one or more audio IVR menus is possible.

FIGS. 4A and 4B illustrate exemplary components of the communication device 102a for implementing the Visuphone 104. The communication device 102a includes a system bus 426 to connect the various components. Examples of system bus 426 include several types of bus structures including a memory bus, a peripheral bus, or a local bus using any of a variety of bus architectures. As discussed with reference to FIG. 1A, the communication device 102a can be a communication device such as computer, a smart-phone and so forth. Device 102a may connect to Public Switched Telephone Network (PSTN) 110 through a radio interface 408 in a wired or wireless manner. For example, radio interface 408 may provide 2G, 3G, and/or 4G connectivity in case of device 102a being a mobile phone. Further, the communication device 102a can connect to PSTN 110 through a gateway 424, which is connected to Network 114 through a network interface 410. Input/Output (IO) interface 412 of the communication device 102a may be configured to connect external or peripheral devices such as a memory card 416, a keyboard 418, a Universal Serial Bus (USB) device 420 and a mouse 422. Although not shown, various other devices can be connected through IO interface 412 to the communication device 102a. In an embodiment of the invention, communication device 102a may be connected to a hub that provides various services such as voice communication, Network access, television services and so forth. For example, the hub may be a Home Gateway device that acts as a hub between the home environment and the Broadband Network.

The communication device 102a includes a display 402 to output graphical information to the user 106. In an embodiment of the invention, the display 402 may include a touch sensitive screen. Therefore, the user 106 can provide inputs to the communication device 102a by touching display 402 or by point and click using the 'mouse'. Memory 406 of the communication device 102a stores various programs, data and/or instructions that can be executed by a Processor 404. Examples of the memory 406 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 102a. The memory 406 may include Operating System (OS) (not shown) for the communication device 102a to function. Further, the memory 406 may include other applications that enable the user 106 to communication with the destinations 108a-n. Examples of other applications include, but are not limited to, Skype, Google Talk, Magic Jack, and so forth. Other applications may be stored as software or firmware on the communication device 102a.

Further, the memory 406 includes Visuphone 104 for providing a visual representation of the destinations 108a-n. As discussed with reference to the FIG. 1A, the Visuphone 104 may be hardware, a software or a firmware stored on the communication device 102a. In an embodiment, the Visuphone 104 may be implemented as plug-in to other applications. The visual IVR menus are stored in a database 414 in memory 406 of the communication device 102a. The database 414 further stores phone numbers of destinations 108a-n, properties and business categories associated with the destinations 108a-n. The Visuphone 104 may determine a business category associated with the dialed phone number of a destination. Further, the Visuphone 104 searches the database 414 for destination phone numbers matching the business category of the dialed destination phone number. In an embodiment of the invention, the Visuphone 104 requests a server for updates when a phone number matching the business category of the dialed destination phone number is not found in the database 414. Further, the communication device may also request or receive updates from the server at a pre-defined time intervals. The pre-defined time interval may be for example, once a week, once a month, or any other interval predefined by the user 106 or the Visuphone 104.

Further, the Visuphone 104 may filter the results of the search based on a location code associated with the communication device 102*a*. The location code may be associated with the current location of the user 106 of the communication device 102. In an embodiment of the invention, the Visuphone 104 may also filter the results based on the location code of the communication device 102*a* and dialed destination phone number. The Visuphone 104 displays the visual IVR menu of the dialed destination phone number when a matching destination based on the location code is not found. When a matching destination is found, the Visuphone 104 displays a visual representation including one or more destinations with their associated properties on a display 402, as discussed with reference to FIG. 3. In an embodiment, the representation includes maps. The displayed one or more destinations includes properties associated with all the destinations operating in same business category and may be within a pre-defined range of distance from the communication device 102*a*. For example, if a user 106 has dialed a number of a pizzeria, then all the outlets serving pizza in a range of, for example; 5 km from the location of the user 106 will be displayed on the display 402, also including the details of other vendor outlets. So the representations shown to the user 106 includes that of the number dialed and also include information about other vendor outlets present within the pre-defined range. Therefore, the user 106 is presented with all the options available within a range from his/her present position, on the communication device 102*a* screen. In an embodiment of the invention, the Visuphone 104 displays at least one property associated with one or more destinations 108*a-n* based on the identified dialed phone number of a destination 108.

The user 106 can select a destination from the representation on the communication device 102*a* screen according to his/her preference. The user 106 can select a destination from the representation of one or more destinations. The user may prefer to select a destination which is near to his present location though it's not the one he/she dialed for. The user may also prefer to select a destination who has good reviews and is little far than the dialed destination. Subsequently, the visual IVR menu of the selected destination is presented on display 402. The visual IVR menu has one or more options. Thereafter, the user 106 can interact with the visual IVR menu accordingly.

The user 106 may dial a phone number corresponding to a destination using keyboard 418. The keyboard 418 may be a physical keyboard or a virtual keyboard displayed on a touch screen display 402. In an embodiment, the keyboard 418 is a keypad on the communication device 102*a*. Subsequently, after some processing by the Visuphone 104, the visual IVR menu 302 corresponding to dialed destination phone number is searched and displayed on display 402.

In an exemplary instance, if the user 106 dials a phone number of a destination, then a representation of one or more destinations is displayed on display 402. Thereafter, on selection by the user 106, a visual IVR menu corresponding to an audible IVR menu of the selected destination is displayed on the display 402. Similarly, if the user 106 receives a call from a destination phone number, then a visual IVR menu corresponding to audible IVR menu of destination is displayed on the display 402. Thereafter, the user 106 can interact with the visual IVR menu to select an option from the visual IVR menu. The representation of one or more destinations and the visual IVR menu is displayed before actual connection of the communication device 102*a* to destination. Therefore, the user 106 can select a desired action from the visual IVR menu before connecting to destination. In an embodiment of the invention, the visual IVR menu may be provided in real-time to user. In an embodiment of the invention, the visual IVR menu is provided by a messaging service such as a Short Messaging Service (SMS). Therefore, destinations may provide customized visual IVR menu to the user 106. The visual IVR menu may be customized based on the profile of user. In an embodiment of the invention, the profile may be generated based on access pattern of user or the data capture by a hub connected to the communication device 102*a*.

User can interact with the visual IVR menu by pressing a desired button from the keyboard 418. For example, the user can press a '3' key from the keyboard 418 to select a node 3 in the visual IVR menu 302. Further, the user 106 can directly select the node 3 of the visual IVR menu 302 from the display 402, in case of a touch sensitive screen. Depending on the complexity or size of destinations, visual IVR menu 302 may have various nodes. Moreover, display area of the display 402 may be limited or small. As a result, all the nodes of the visual IVR menu 302 may not be displayed together on the display 402. In such a case, the Visuphone 104 is configured to allow the user 106 to navigate by scrolling horizontally and/or vertically to view nodes on the visual IVR menu 302. Further, the Visuphone 104 may detect the capability of the communication device 102*a* before displaying the visual IVR menu 302. For example, in case the communication device 102*a* is a basic mobile phone with limited functionality of the display screen. Therefore, the Visuphone 104 may display the visual IVR menu in form of a simple list. Similarly, a list may be displayed in case of fixed line or wired telephones. Moreover, in case the communication device 102*a* includes a high capability screen, such as but not limited to an iPhone, then the visual IVR menu is displayed in form of graphics. Subsequently, after the user 106 selects a desired action from the visual IVR menu 302, a connection is established between the communication device 102*a* and the selected destination. In one embodiment, the Visuphone 104 is configured to detect and present an application or computer program available on the communication device 102*a*.

In an embodiment, a user 106 may dial a phone number from a VOIP application 428 on the communication device 102*b*, as shown with reference to FIG. 4B. The phone number may correspond to any of destination from the destinations 108*a-n*. In an embodiment, the user 106 selects a pre-stored phone number from the VOIP application 428. Subsequently, the Visuphone 104 searches the database 114 for one or more destinations matching a business category of the dialed destination phone number. As discussed with reference to FIG. 2, the representation of the one or more destinations is provided on the display 402. Subsequently, after detecting selection from the user 106, the visual IVR menu of the selected destination is displayed on the display 402.

In an embodiment, the Visuphone 104 may include a VOIP plug-in that monitors the outgoing calls made from the VOIP application. Therefore, the VOIP plug-in may search each dialed number in the database 414. In case, the dialed number is found in database 414 and is associated with an audible IVR, then the VOIP plug-in may display the visual IVR menu corresponding to the audible IVR menu of the dialed destination phone number.

In one embodiment, the Visuphone 104 is configured to detect and present applications suitable to the user 106 for initiating the connection. For example, the Visuphone 104 may detect more than one VOIP applications present in the communication device 102*b* and present them to the user 106 on the display 508. Thereafter, the user 106 can select an application to be used or initiate the connection in a default configuration. The default configuration can be for example, a VOIP application 428 on which destination phone number was dialed. In another embodiment, the user 106 may select a phone number displayed in applications such as a browser, messenger, or a mail client. Subsequently, the Visuphone 104 detects and presents applications suitable to the user 106 for initiating the connection. Furthermore, the Visuphone 104 is configured to display the visual IVR menu 302 for the phone number selected from the applications.

In an embodiment, the communication device 102*b* may include a web browser to display web pages from the Network and/or other computer networks. Various websites provide a phone number on the web pages as a click-to-talk button. The clickable button can provide, for example, a contact number of executives of the organization. The clickable button may be programmed to display a phone number of the organization and/or display a user a form to provide his contact details, so that an executive from the organization can call back the user. The Visuphone 104 is configured to detect a connect button a webpage. Connect button may be used by the Visuphone 104 to initiate a connection to a destination. The Visuphone 104 detects and launches a VOIP application on the communication device 102*b*. In an embodiment, in case more than one application is available on the communication device 102, the Visuphone 104 selects a VOIP application preferred by the user 106. Moreover, the Visuphone 104 may be configured to automatically login into the VOIP application. In an embodiment, the user 106 stores the login details for the VOIP application in the Visuphone 104. Further, the Visuphone 104 displays a visual IVR menu corresponding to audible IVR menu of the destination connected once clicked on the connect tab. Therefore, the user 106 can connect to the destination from web browser automatically and may not be required to dial the phone number or provide call-back information.

FIG. 5 illustrates exemplary components of the communication device 102*b* for implementing the Visuphone 104, in accordance with another embodiment of the invention. The communication device 102*b* includes a system bus 524 to connect the various components. Examples of the system bus 524 include, but are not limited to, a memory bus or memory controller, a peripheral bus, or a local bus using any of a variety of bus architectures. As discussed with reference to FIG. 1B, the communication device 102*b* can be a computing device such as, but not limited to, a personal computer, a laptop, a mobile phone, a smart-phone, and so forth. In an embodiment, the communication device 102*b* is an in-car navigation system. In the navigation system, the Visuphone 104 provides the representation of one or more destinations on a map. The communication device 102*b* can connect to the Network 114 through a network interface 510. Further, the communication device 102*b* can connect to the PSTN 110 through the gateway 112 and the Network 114 through the network interface 510. An Input/Output (IO) interface 512 of the communication device 102*b* may be configured to connect external or peripheral devices such as a mouse 514, a keyboard 516, a speaker 518, a camera 520, and a microphone 522. Although not shown, various other devices such as a hard disk, a Universal Serial Bus (USB) device or others can be connected through the IO interface 512 to the communication device 102*b*. A person skilled in the art will appreciate that although not described, various other types of devices capable of voice and/or data communication can be connected to the communication device 102*b*.

The communication device 102*b* includes a display interface 502 to connect to a display 508. The display interface 502 can be for example, a video adapter. The display 508 outputs graphical information to the user 106. In an embodiment of the invention, the display 508 includes a touch sensitive screen. Therefore, the user 106 can provide inputs to the communication device 102*b* by touching display 508 or by scrolling and pointing with the mouse 514 and a click. Memory 506 of the communication device 102*b* stores various programs, data and/or instructions that can be executed by a processor 504. Examples of the memory 506 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 102*b*. The memory 506 may include Operating System (OS) (not shown) for the communication device 102*b* to function. Further, the memory 506 may include other applications that enable user 106 to communication with destinations 108*a-n*. Examples of other applications include, but are not limited to, Skype, Google Talk, Magic Jack, and so forth. Other applications may be software or firmware stored on the communication device 102*b*. Further, the memory 506 includes the Visuphone 104 for searching and selecting one or more destination matching a business category of the dialed destination phone number. Further, the Visuphone 104 is capable of filtering the one or more destination based on the location code of the communication device 102*b*. The location code determines the current location of the communication device 102*b*. In an embodiment, the Visuphone 104 can filter the one or more destinations based on the current location of the dialed destination phone number. Further, the Visuphone 104 is capable of presenting a visual IVR menu corresponding to the audible IVR menu of a selected destination as discussed with reference to FIG. 3. The Visuphone 104 may be an application stored as a software or firmware on the communication device 102*b*. The memory 506 further includes a database 414. As discussed in FIGS. 4A and 4B, the visual IVR menus are stored in the database 414 in memory 506 of the communication device 102*b*. Further, the database 414 includes phone numbers of destinations 108*a-n*, one or more properties and business categories associated with the destinations 108*a-n*.

In an exemplary instance, if user 106 dials a destination phone number. The user 106 is presented with representation of the one or more destinations with their associated at least one property. As discussed in FIGS. 2 and 3, the representation 202, 204, 206, 208 and the visual IVR menu 302 are displayed before actual connection of the communication device 102*b* with the destination. Therefore, the user 106 can select a desired option from the visual IVR menu 302 before establishing a connection to the destination. Depending on the complexity or size of the destinations, visual IVR menu 302 may have various nodes. For example, an organization with 50 departments may have more menu options or nodes than that of an organization with 10 departments. Further, the display area of display 508 may be limited. As a result, all the nodes of the visual IVR menu 302 may not be displayed together on display 508. In such a case, the Visuphone 104 is configured to allow the user 106 to navigate by scrolling horizontally and/or vertically to view nodes on the visual IVR menu 302. Moreover, the user 106 can search for a desired option from the visual IVR menu 302. Subsequently, after user 106 selects a desired option from the visual IVR menu 302, a connection is established between device 102b and a destination based on the selected action.

Another embodiment of the invention allows the user to select the visual IVR menu using car display like GPS display. Hands-free cell phone system is used in many cars as a separated device or as an integrated system in the car. These devices allow the user to talk with the cell phone without holding the cell phone in his hands. Some devices are using the car speakers for the phone call. In many cases, the hands-free system can use a display screen in the car like GPS screen or other display. Following voice menu while driving might not be the optimal way to use hands-free cell phone system. In some cases, selecting an option from a visual IVR menu is preferred. While driving or stopping in red light, it might be easier to use larger display like the GPS display in the car. The display can present the visual IVR menu and the user can select the option from the menu. The computing engine to support the visual IVR menu could be embedded in the car GPS system or in another controller that have access to the car display. Once the system recognizes a destination of a call to be an IVR it will access the database, and pull out the representation of one or more destinations and display. Accordingly all the other features of the Visuphone 104 could be incorporated.

FIGS. 6A, 6B, and 6C illustrate a flowchart for providing an enhanced telephony, in accordance with an embodiment of the invention. The user 106 may dial, select or receive one or more destination phone numbers to connect to a destination from the communication device 102. The destinations 108a-n may include an audible IVR menu for interaction with a user. Further, the communication device 102 may include the Visuphone 104 to display representation of one or more destinations and their associated properties on the communication device 102 screen. The Visuphone 104 also presents visual IVR menu corresponding to the phone number of the selected destination. Therefore, a user can directly interact with a visual IVR 302 of selected destination through the visual IVR menu 302 without listening to the audible IVR menu.

At step 602, the Visuphone 104 identifies a phone number of a destination dialed by the user 106 of the communication device 102. In an embodiment of the invention, the number is clicked according to the display of the communication device 102. The number is identified by the processor 404. In an embodiment of the invention, the Visuphone 104 displays at least one property associated with one or more destinations 108a-n based on the identified dialed phone number of the destination.

Further, at step 604, a location code associated with current location of the communication device 102 is determined. The location code determines the present location of the communication device 102. When the user 106 is in his/her home country or state, the location code of the communication device and location code of the dialed destination phone number is same. In an embodiment, the location code of the user 106 is different than the location code of the dialed destination phone number. This happens, in case when the user 106 is travelling and the communication device 102 is on roaming. The processor 404 determines the location code of the communication device 102. At step 606, the processor 404 determines a business category associated with the dialed destination phone number. The destinations 108a-n are categorized into various groups based on their associated business category. Various destinations are grouped into a business category based on the services and operations of the destinations.

At step 608, the processor 404 searches the database 114, for phone numbers of the destinations matching the business category of the dialed destination phone number. Further, at step 610, the processor 404 checks whether the destination phone numbers matching the business category are available in the database 414. In case the one or more destination phone numbers are available, then the process continues to step 612, else the process continues to step 628. At step 612, the processor 404 searches for at least one phone number from the one or more destination phone numbers based on the location code. The location code is associated with the communication device 102. The location code determines the present location of the communication device 102. In an embodiment, the processor 404 searches for at least one phone number from the one or more destination phone numbers based on the location code of the communication device 102b and a location code of the dialed destination phone number. At step 614, the processor 404 checks whether the at least one destination phone number matching the location code of the communication device is available in the database 414. In case the at least one destination phone number, based on the location code, is not available then step 626 is executed. At step 626, a visual IVR menu of the dialed destination phone number is displayed on the display 402, as shown with reference to FIG. 6C.

At step 614, when the at least one destination phone number matching the location code of the communication device 102 is available in the database 414, the process continues to step 616. At step 616, the at least one destination phone number with its associated properties are displayed. The processor 404 displays the at least one destination phone number and associated properties are displayed on the display 402 of the communication device 102. Further, at step 618, the user 106 selects a destination phone number from the displayed destinations. At step 620, a visual IVR menu of the selected destination is displayed on the communication device 102 screen. The processor 404 displays the visual IVR menu on the display 402. As discussed with reference to FIG. 3, the visual IVR menu 302 includes one or more options. At step 622, the user 106 selects an option from the visual IVR menu 302. Thereafter, at step 624, the communication device 102 connects to the selected option of the visual IVR menu. Then the user 106 can interact according to his/her preference with the destination through the visual IVR menu. Thereafter, the process terminates after step 624.

At step 610, when the one or more destination phone numbers matching the business category of the dial phone number, are not available in the database, the process continues to step 628, the communication device 102 requests for updates from the server. The updates include information of destinations 108a-n. The destination information includes destination phone number, and their associated properties. Further, at step 630, the updates are received from the server. The communication device 102 receives the updates. Then, at step 632, the received updates are stored in the database 414 on the communication device 102. Thereafter, the process continues to step 608. In another embodiment of the invention, electronic yellow pages directory allows the dialing the number directly from the directory and further provides representation of one or more destinations and the visual IVR menu of the destination. The user can select the exact destination before dialing or follow the visual IVR menu after dialing. For example, an airline company might have various option, menus and layers in the large organization. Selecting the exact department in the organization before dialing can save the user the time and overhead of listening to the menu and making decisions based on the voice menu. The yellow pages company can have a copy of the visual IVR menu database or can be connected to a visual IVR menu service in order to provide the menu to the user.

Alternatively an enhanced web based yellow page could be provided, wherein the user can first choose the provider he requires to contact. Thereafter, if that destination provides an IVR, then the enhanced yellow page will use the visual IVR menu database to present a visual IVR menu on the web page. Moreover, the user can click to choose the internal destination of that provider and the enhanced yellow page may accordingly initiate the call. The call could be made using the conventional telephone network or PSTN. In this case, the enhanced yellow page may need the user's telephone number to perform the connection. Alternatively, the enhanced yellow page could use a VOIP to connect the user over the web to the IVR of the destination.

In some IVR systems, the user may have to wait or hold on a queue of previous dialers until the specific department or agent is available. In another embodiment of the invention, the enhanced yellow page system will connect the user only after the specific agent is available, without waiting in a long waiting line queue. The system can recognize that the waiting queue message of the specific department, and to connect the user only after the agent is answering. Therefore, the waiting time of the user on the phone queue that sometimes may be very long, may be reduced. The system can park on the line for the waiting line on the specific entry in the menu, as soon as the agent is available the user gets a signal to start the conversation with the agent.

Additional advantage of the invention relates to users who are more proficient in foreign language. Application may provide the visual IVR menu in multiple languages. A user can than choose a language of his choice and download to his device database the menu in that language.

Another advantage of the invention is that it provides user with information about all the matching destinations available in his/her vicinity. So the user has more choices of destinations to choose from based on their one or more properties.

Yet another advantage of the invention relates to IVR that ask for voice commands. This IVR interface is for some user harder to use due to accent or other problems. The database could be provided with the option as been described before for the system to output voice command according to user selection of the menu options.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An enhanced communication device, comprising:
   a memory coupled to a processor, the memory comprising:
      a database comprising:
         one or more destination phone numbers; and
         at least one property associated with the one or more destination phone numbers; and
      instructions executable by the processor for:
         identifying a dialed phone number of a destination dialed from the communication device from a plurality of destinations;
         determining a location code associated with a current location of the communication device;
         comparing the dialed phone number to the one or more destination phone numbers; and
         displaying the at least one property associated with the one or more destination phone numbers based on the comparison.

2. The enhanced communication device of claim 1, wherein the memory further comprises instructions executable by the processor for:
   determining a business category associated with the dialed phone number, wherein the plurality of destinations are categorized into various business categories; and
   selecting at least one destination phone number from the database based on the business category and said location code.

3. The enhanced communication device of claim 1, wherein the memory further comprises instructions executable by the processor for:
   selecting, by a user, a destination phone number based on the displayed at least one property; and
   displaying a visual Interactive Voice Response (IVR) menu associated with the selected destination phone number.

4. The enhanced communication device of claim 3, wherein the memory further comprises instructions executable by the processor for:
- selecting an option from the displayed visual IVR menu; and
- establishing a communication with the selected destination phone number based on the selection.

5. The enhanced communication device of claim 3, wherein the database further comprises the visual IVR menu associated with each of the destination phone numbers.

6. The enhanced communication device of claim 1, wherein the memory further comprises instructions executable by the processor for:
- receiving updates from a server at a pre-defined time interval; and
- requesting the server for updates when a destination phone number match is not found for the dialed phone number.

7. The enhanced communication device of claim 6, wherein the memory further comprises storing the received updates from the server.

8. The enhanced communication device of claim 1 wherein the location code of the communication device is determined by one of a Global Positioning system or a location service of a telephone service provider of the communication device.

9. The enhanced communication device of claim 1 wherein the location code of the communication device is determined based on a Internet Protocol (IP) address of the communication device.

10. A method for providing enhanced telephony, the method comprising:
- identifying a phone number of a destination dialed from a communication device from a plurality of destinations;
- determining a location code associated with a current location of the communication device;
- comparing the dialed phone number to one or more destination phone numbers stored in a database, wherein a database comprises at least one property associated with the destination phone numbers; and
- displaying, at the communication device, the at least one property associated with the one or more destination phone numbers based on the comparison.

11. The method of claim 10 further comprising:
- determining, at the communication device, a business category associated with the dialed phone number, wherein destinations are categorized into various business categories; and
- selecting, at the communication device, at least one destination phone number from the database based on the business category and said location code.

12. The method of claim 10 further comprising:
- selecting a destination phone number based on the displayed at least one property, the user selects the destination phone number; and
- displaying, at the communication device, a visual Interactive Voice Response (IVR) menu associated with the selected destination phone number, wherein the database comprises a visual IVR menu associated with each of the destination phone numbers.

13. The method of claim 12, further comprising:
- selecting an option from the displayed visual IVR menu; and
- establishing a communication with the selected destination phone number based on the selection.

14. The method of claim 10 wherein displaying the at least one property further comprises requesting a server for updates when a destination phone number match is not found for the dialed phone number.

15. The method of claim 14, further comprising receiving updates from the server at a pre-defined time interval, the updates being received at the communication device.

16. An enhanced communication device comprising:
- a database comprising:
  - one or more destination phone numbers; and
  - at least one property associated with the one or more destination phone numbers;
- means for identifying a dialed phone number of a destination dialed from a communication device from a plurality of destinations;
- means for determining a location code associated with a location of the communication device;
- means for comparing the dialed phone number to the one or more destination phone numbers; and
- means for transferring to be displayed the at least one property associated with the one or more destination phone numbers based on the comparison.

17. The enhanced communication device of claim 16 further comprising:
- means for determining a location code associated with a user current location of the communication device; and
- means for comparing the dialed phone number to the one or more destination phone numbers.

18. The enhanced communication device of claim 16 further comprising:
- means for determining a business category associated with the dialed phone number, wherein the plurality of destinations are categorized into various business categories; and
- means for selecting at least one destination phone number from the database based on the business category and said location code.

19. The enhanced communication device of claim 16 further comprising:
- means for selecting, by a user, a destination phone number based on the displayed at least one property; and means for displaying a visual Interactive Voice Response (IVR) menu associated with the selected destination phone number.

20. The enhanced communication device of claim 16 further comprising:
- means for receiving updates from a server at a pre-defined time interval; and
- means for requesting the server for updates when a destination phone number match is not found for the dialed phone number.

\* \* \* \* \*